Patented Sept. 17, 1935

2,014,902

UNITED STATES PATENT OFFICE 2,014,902

PROCESS OF MAKING A FOOD PRODUCT

Harry A. Lipson, Cleveland, Ohio

No Drawing. Application September 19, 1932,
Serial No. 633,843

4 Claims. (Cl. 99—11)

This invention relates to dairy food products and processes employed in producing them.

The principal object is to provide an improved method of mixing or incorporating together honey and butter or honey butter and egg yolk. A further object is to provide a method which will attain the above object and result also in the formation of one or more valuable by-products. A still further object is the provision of a series of kinds of cheese each having substantially its normal physical properties as well as a substantial content of honey or similar carbohydrate. Other and more limited objects will become apparent from the following description, especially when considered in connection with the appended claims.

Prior to my invention there has been manufactured and marketed a mixture of honey and butter having physical properties similar to butter, particularly the property of solidity at substantially the temperatures at which butter is solid, and accordingly I do not claim this product broadly. Considerable difficulty has been experienced in securing a honey-butter mixture having the above mentioned properties and the product now on the market is made by some special process, of the nature of which I am not aware.

I have discovered that a honey-butter mixture having these properties may be made very simply and cheaply and without special apparatus. In accordance with my invention, a quantity of honey is added to the milk or cream before the formation of butter or just as the butter is beginning to form so that it has a somewhat granular appearance, resembling cornmeal mush. In this way the honey and butter are brought into such relation that when the honey-butter mixture is separated from the remaining material, the desired physical properties are obtained. The term "mixture" is herein used as a generic term including solutions, emulsions and colloidal dispersions. The quantity of honey added prior to the formation of butter may be quite small, for example, as low as from 2% to 5% of the total weight of the mixture, or it may be the entire amount used and serves to condition the resulting honey-butter mixture so that additional honey may be added after the formation of butter without destroying the desired physical characteristics of the product. In practice I prefer to use an amount of honey such that its partition between the butter and buttermilk formed in the churning process will result in the addition of the desired quantity of honey to the buttermilk for the formation of a tasty food product, and at the same time condition the butter to receive additional honey. If rich cream or milk is being churned, the amount of honey initially added will of course be greater than in the case of whole milk without the addition of extra cream. After the butter has formed, the mixture containing butter and a small amount of honey is separated from the by-product honey-buttermilk and preferably additional honey and egg yolk are added to the honey-butter mixture. The egg yolk so added will preferably be prepared as set forth in detail in my co-pending application, Serial No. 617,482, filed June 15, 1932. It is thought unnecessary to describe the egg yolk preparation in detail since it forms no part of the present invention. It is to be understood that the egg yolk may or may not be added, depending upon the final product desired and that the additional honey and egg yolk may be added together or in any sequence.

It is to be understood that the honey-buttermilk mixture may be formed independently of this process as, for example, by the addition of a suitable quantity of honey to already formed buttermilk or to skim milk which may be then converted into buttermilk with or without the addition of a quantity of cream. In any case, superior results can be had if commercial honey is heated sufficiently to remove a portion of its moisture content before it is used. For example, it may be heated at 125° F. for five or ten minutes and then cooled to about body temperature before mixing with the milk products.

The honey-buttermilk mixture may be distributed and consumed in the condition in which it is removed from the churn or it may be dehydrated and distributed as a concentrate either in the form of a thick liquid or a powder.

It is also within the contemplation of my invention to add a quantity of honey to milk products before they are treated to form various kinds of cheese, following out the usual steps of the cheese manufacturing process which consist essentially in heating and concentrating to form a curd and thereafter removing the whey and curing the product. For this purpose the honey may or may not be dehydrated and the result is a cheese having substantially the same physical properties as it would possess if the honey had not been added. Other suitable carbohydrate may be substituted for honey.

A honey-butter egg yolk mixture may contain approximately 45% by weight of honey, 30 parts butter and 25 parts egg yolk. These proportions are given by way of example and are not in any way critical but may be widely departed from.

While I have described the present preferred embodiment of my invention, I wish it understood that I am not limited to the details thereof but only in accordance with the spirit and scope of the appended claims.

Having thus described my invention, what I claim is:

1. In the process of making a mixture of honey and butter, the steps of adding honey, during the churning of a milk product to form butter, at the stage when the butter is beginning to separate, continuing the churning whereby to form a mixture of honey and butter, and separating said mixture of honey and butter from the liquid portion of the milk product.

2. In the process of making a mixture of honey and butter, the steps of adding honey, during the churning of a milk product to form butter, at the stage when the butter is beginning to separate, continuing the churning whereby to form a mixture of honey and butter, separating said mixture of honey and butter from the liquid portion of the milk product, and adding additional honey to the said mixture of honey and butter.

3. In the process of making a mixture of honey and butter, the steps of adding honey, during the churning of a milk product to form butter, at the stage when the butter is beginning to separate, continuing the churning whereby to form a mixture of honey and butter, separating said mixture of honey and butter from the liquid portion of the milk product, and adding egg yolk to the said mixture of honey and butter.

4. In the process of making a mixture of honey and butter, the steps of adding honey, during the churning of a milk product to form butter, at the stage when the butter is beginning to separate, continuing the churning whereby to form a mixture of honey and butter, separating said mixture of honey and butter from the liquid portion of the milk product, and adding a quantity of egg yolk and a further quantity of honey to said mixture of honey and butter.

HARRY A. LIPSON.